(12) United States Patent
Pezeshki et al.

(10) Patent No.: US 11,627,541 B2
(45) Date of Patent: Apr. 11, 2023

(54) PREDICTIVE METHODS FOR SSB BEAM MEASUREMENTS

(71) Applicant: QUALCOMM Incorporated, San Diego, CA (US)

(72) Inventors: Hamed Pezeshki, San Diego, CA (US); Tao Luo, San Diego, CA (US); Junyi Li, Fairless Hills, PA (US); Taesang Yoo, San Diego, CA (US); Sony Akkarakaran, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 75 days.

(21) Appl. No.: 17/354,767

(22) Filed: Jun. 22, 2021

(65) Prior Publication Data
US 2022/0408381 A1    Dec. 22, 2022

(51) Int. Cl.
*H04W 24/08*    (2009.01)
*H04W 56/00*    (2009.01)
*G06N 3/02*     (2006.01)

(52) U.S. Cl.
CPC ............ *H04W 56/001* (2013.01); *G06N 3/02* (2013.01); *H04W 24/08* (2013.01)

(58) Field of Classification Search
CPC ................................ H04L 12/28; H04L 12/50
USPC ........................................................ 370/329
See application file for complete search history.

(56) References Cited

U.S. PATENT DOCUMENTS

| 2019/0386726 | A1  | 12/2019 | Fresia et al. |
| 2020/0358514 | A1  | 11/2020 | Landis et al. |
| 2022/0217789 | A1* | 7/2022  | Lee ................... H04W 74/0816 |

FOREIGN PATENT DOCUMENTS

WO    2020214168 A1    10/2020

OTHER PUBLICATIONS

International Search Report and Written Opinion—PCT/US2022/072990—ISA/EPO—dated Oct. 10, 2022.

* cited by examiner

*Primary Examiner* — Dang T Ton
(74) *Attorney, Agent, or Firm* — Arent Fox, LLP

(57) ABSTRACT

A user equipment may be configured to perform predictive methods for SSB beam measurements. In some aspects, the user equipment may receive, from at least a base station, a first set of one or more synchronization signal block beam identifiers corresponding to a first set of one or more SSB beams belonging to a SSB burst, and receive, from at least the base station, the SSB burst including the first set of one or more SSB beams. Further, the user equipment may transmit, to at least the base station, one or more of: reporting information for a second set of one or more SSB beams or indications corresponding to the second set of one or more SSB beams, the second set of one or more SSB beams determined based on a prediction model and the first set of one or more SSB beams.

30 Claims, 10 Drawing Sheets

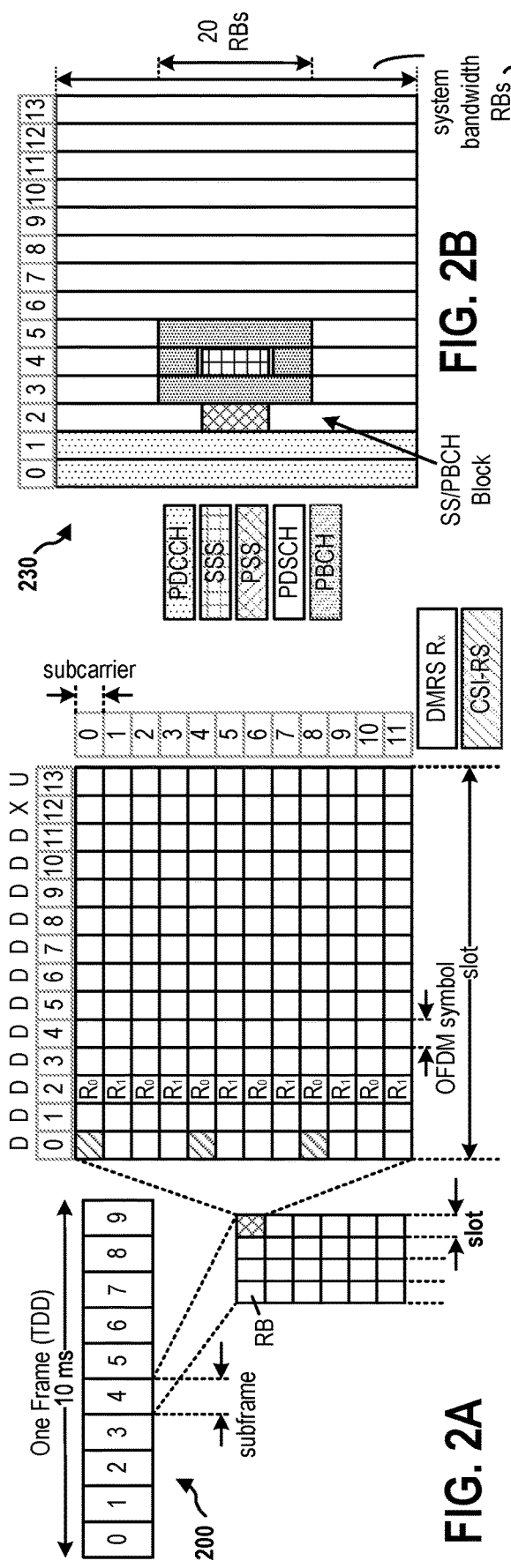
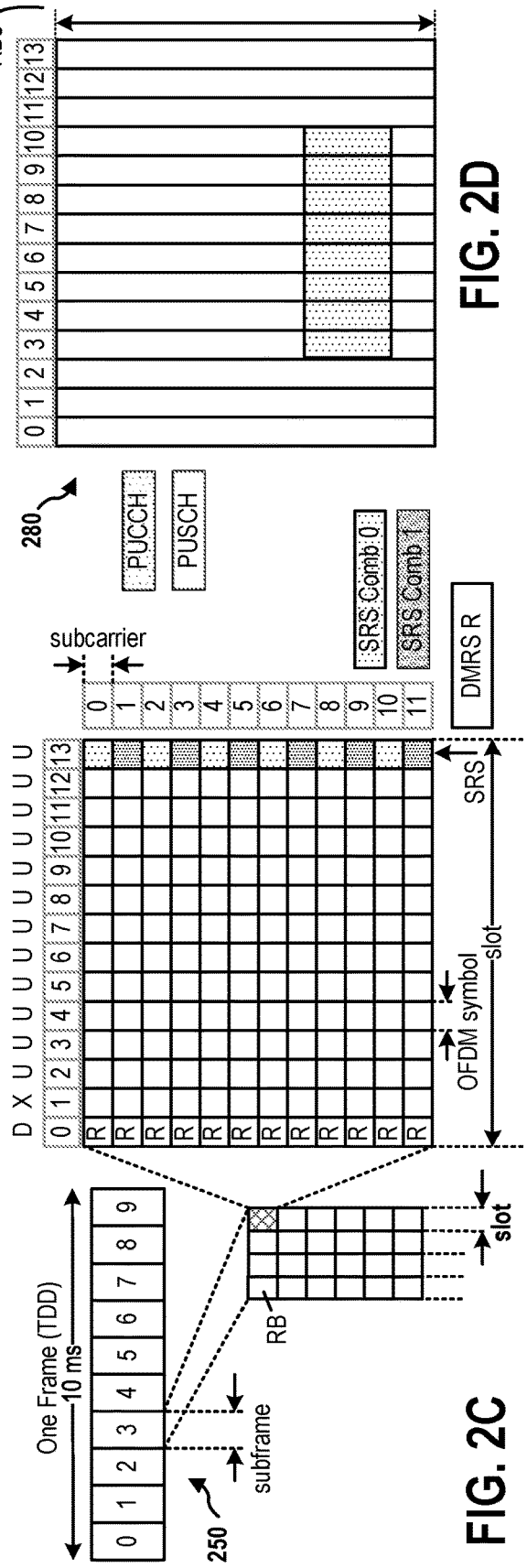

PREDICTIVE METHODS FOR SSB BEAM MEASUREMENTS

BACKGROUND

Technical Field

The present disclosure relates generally to wireless communication, and more particularly, to implementing predictive methods for synchronization signal block (SSB) beam measurements.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) comprising receiving, from at least a base station, a first set of one or more synchronization signal block (SSB) beam identifiers corresponding to a first set of one or more SSB beams belonging to a SSB burst, wherein a number of SSB beams in the first set of SSB beams is less than a total number of SSB beams in the SSB burst; receiving, from at least the base station, the SSB burst including the first set of one or more SSB beams. The method may further comprise transmitting, to at least the base station, one or more of: reporting information for a second set of one or more SSB beams or indications corresponding to the second set of one or more SSB beams, the second set of one or more SSB beams determined based on a prediction model and the first set of one or more SSB beams.

The disclosure also provides an apparatus (e.g., a UE) including a memory storing computer-executable instructions and at least one processor configured to execute the computer-executable instructions to receive, from at least a base station, a first set of one or more synchronization signal block (SSB) beam identifiers corresponding to a first set of one or more SSB beams belonging to a SSB burst, wherein a number of SSB beams in the first set of SSB beams is less than a total number of SSB beams in the SSB burst, receive, from at least the base station, the SSB burst including the first set of one or more SSB beams, and transmit, to at least the base station, one or more of: reporting information for a second set of one or more SSB beams or indications corresponding to the second set of one or more SSB beams, the second set of one or more SSB beams determined based on a prediction model and the first set of one or more SSB beams. In addition, the disclosure also provides an apparatus including means for performing the above method, and a non-transitory computer-readable medium storing computer-executable instructions for performing the above method.

An example implementation includes a method of wireless communication at a base station comprising transmitting, to a user equipment (UE), a first set of one or more SSB beam identifiers corresponding to a first set of one or more SSB beams of a SSB burst, and transmitting the SSB burst including the first set of one or more SSB beams to the UE. Further, the method may comprise receiving, from the UE, a first set of measurements corresponding to the first set of one or more SSB beams, predicting, based at least on the first set of measurements, a second set of one or more SSB beams, and transmitting, to the UE, a second set of one or more SSB beam identifiers corresponding to the second set of one or more SSB beams.

The disclosure also provides an apparatus (e.g., a base station) including a memory storing computer-executable instructions and at least one processor configured to execute the computer-executable instructions to transmit, to a user equipment (UE), a first set of one or more SSB beam identifiers corresponding to a first set of one or more SSB beams of a SSB burst, transmit the SSB burst including the first set of one or more SSB beams to the UE, receive, from the UE, a first set of measurements corresponding to the first set of one or more SSB beams, predict, based at least on the first set of measurements, a second set of one or more SSB beams, and transmit, to the UE, a second set of one or more SSB beam identifiers corresponding to the second set of one or more SSB beams. In addition, the disclosure also provides an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

DETAILED DESCRIPTION

Figure 1:
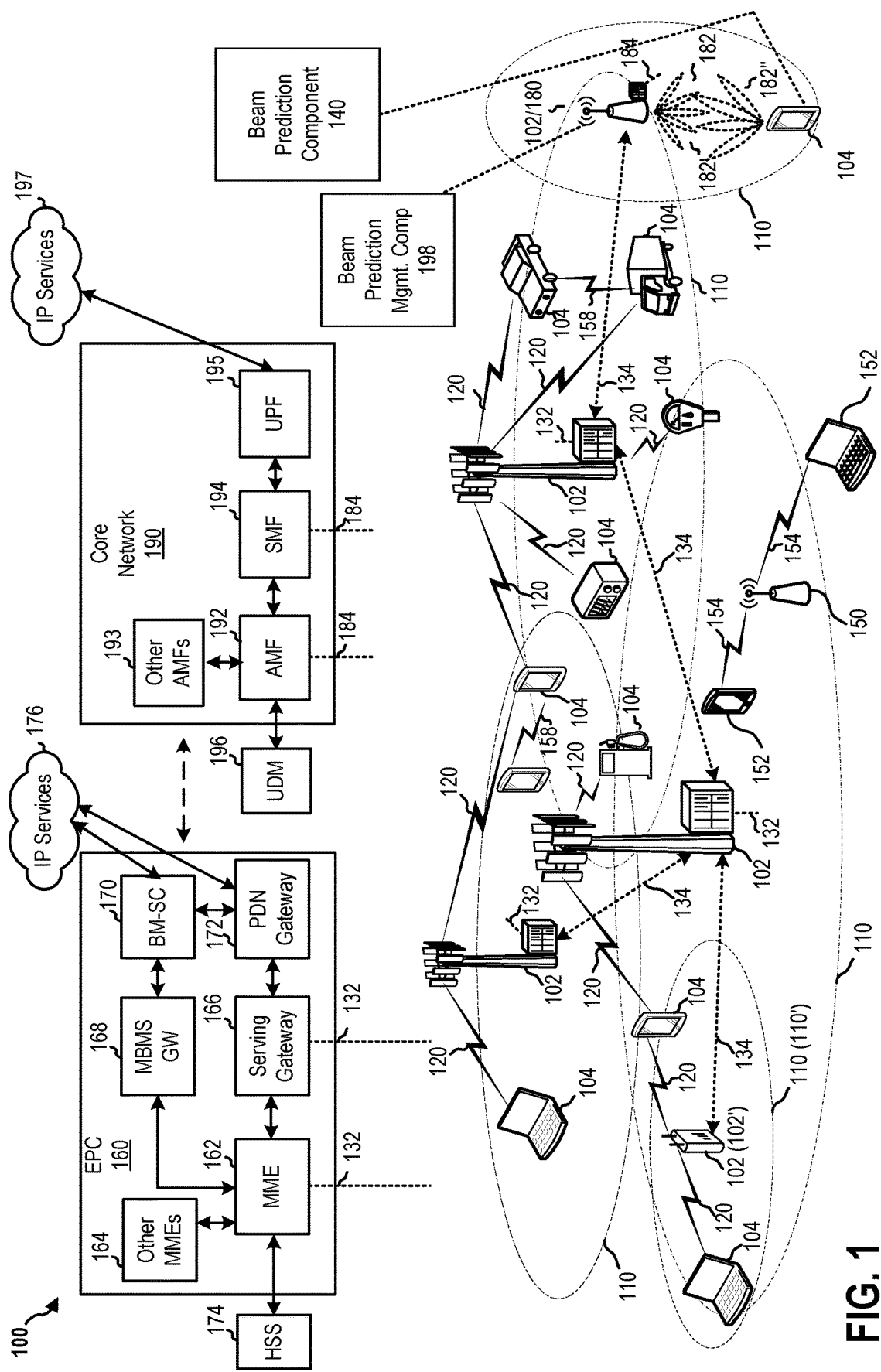
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for implementing predictive methods for SSB beam measurements. In some aspects, a UE may receive a SSB burst from a base station, and determine sample measurements of a first subset of SSB beams of the SSB burst. Further, the base station or the UE may determine a second subset of SSB beams based on inputting the sample measurements into a prediction model. Further, the UE may measure the second subset of SSB beams, and report the measurements of the second subset of SSB beams to the base station. Further, the base station and the UE may use the measurements of the second subset of SSB beams to select one or more beams that will be used for communications between the base station and UE. Accordingly, the present techniques limit the number of SSB beams that a UE needs to measure during beam selection, thereby reducing power consumption by UE devices.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a base station 102 may include a beam prediction management component 198 configured to generate a prediction model configured to predict SSB beams meeting a predefined criteria (e.g., the SSB beams predicted to have the highest RSRP measurement), employ the prediction model to predict the SSB beams meeting the predefined criteria, and facilitate measurement and reporting of the measurements of predicted SSB beams by the individual UEs 104. Further, a UE 104 may include a beam prediction component 140 configured to identify the SSB beams predicted to meet a predefined criteria, determine measurement values of the SSB beams meeting the predefined criteria, and report the measurement values to a base station 102. In some aspects, the UE 104 may employ a prediction model received from a base station to identify the SSB beams predicted to meet the predefined criteria. In some other aspects, the beam prediction management component 198 may provide the SSB beams predicted to meet the predefined criteria. Further, the measurement values of the SSB beams predicted to meet the predefined criteria may be used in a beam selection process performed by the base station 102 and the UE 104.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology μ, there are 14 symbols/slot and 2μ slots/subframe. The subcarrier spacing and symbol length/duration are a function of the numerology. The subcarrier spacing may be equal to $2^\mu *15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
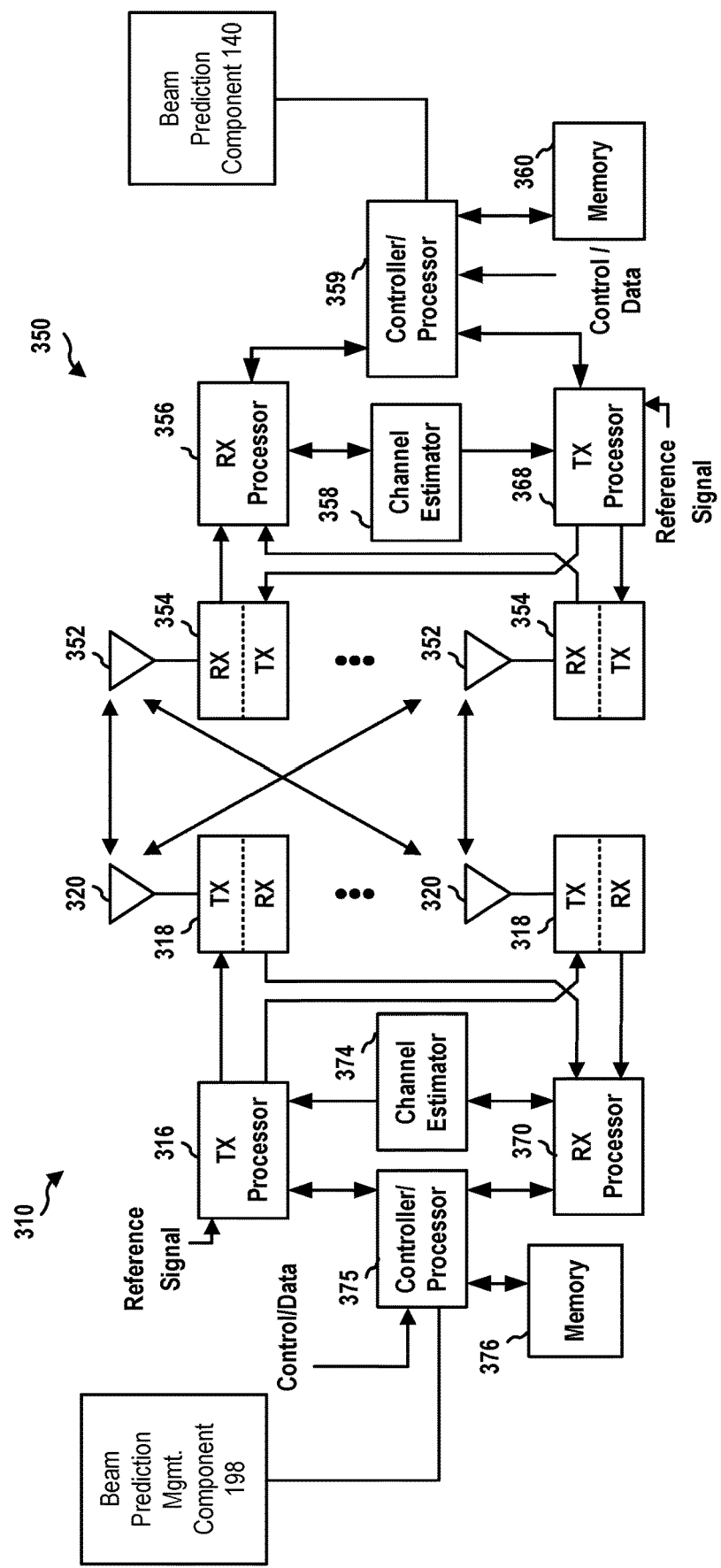
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the beam prediction component 140 of FIG. 1.

In the base station 102/180, at least one of the TX processor 316, the RX processor 370, and the controller/processor 375 may be configured to perform aspects in connection with beam prediction management component 198 of FIG. 1.

In highly-directional systems such as 5G NR, beams may be used between a transmitter (e.g., a base station) and a receiver (e.g., a UE) for data transmission. As a result, base stations and UE may perform beam management procedures (e.g., beam determination, beam measurement, beam reporting, beam recovery, etc.) to facilitate beamformed wireless communications. For example, in a beam-based system, the UE and the network may need to identify the best beam(s) to use for subsequent communications during initial access/cell search. In some instances, a base station may transmit SSBs with different SSB block indices over different beams. The UE may attempt to decode each SSB and measure the signal strength of a reference signal (e.g., Demodulation Reference Signal (PBCH DMRS)) of each SSB it detects for a certain period (e.g., a period of one SSB Burst). Further, the UE may identify one or more SSB indices associated with beams meeting a predefined criteria (e.g., the SSBs having the strongest signal strength). Further, the UE may report the one or more SSB indices to the base station in order to identify the beams meeting the predefined criteria to the base station. However, requiring the UE to attempt to decode and measure each SSB in order to determine which beams meet a predefined criteria may drain the battery power of the UE.

The present disclosure provides techniques for implementing predictive methods for beam measurements (e.g. SSB beam measurements). As described above, current beam management processes require an extensive amount of beam measurements. For example, a UE may be required to measure each SSB beam in a SSB burst. Accordingly, the present techniques predict the plurality of SSB beams within the SSB burst expected to meet a predefined criteria used in a beam management process, thereby minimizing and/or reducing power consumption expended by the UE during beam measurement.

Figure 4A:
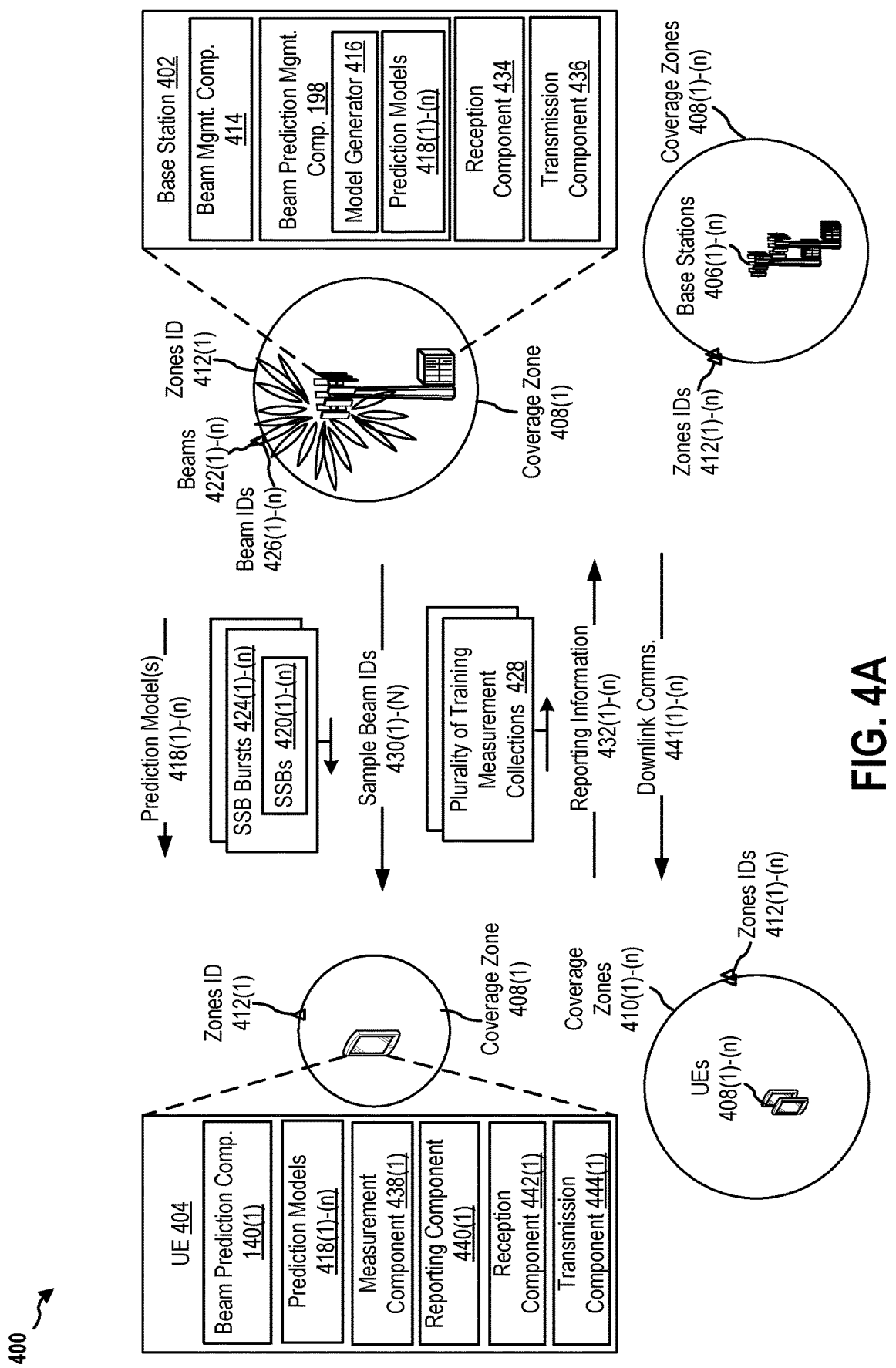
FIG. 4A is a diagram illustrating first example communications and components of a base station and UEs, in accordance with some aspects of the present disclosure.
Figure 4B:
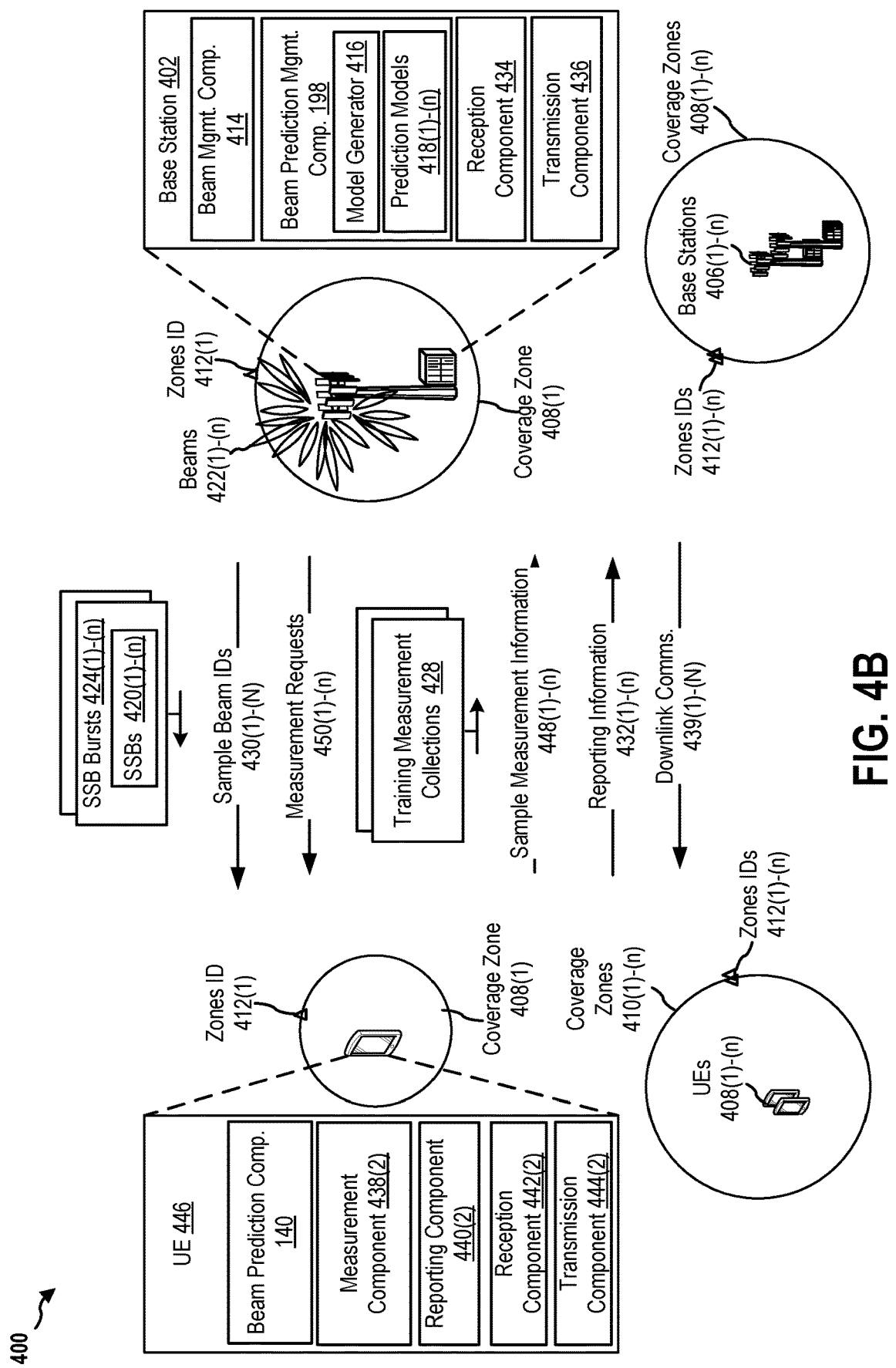
FIG. 4B is a diagram illustrating second example communications and components of a base station and UEs, in accordance with some aspects of the present disclosure.
Figure 4C:
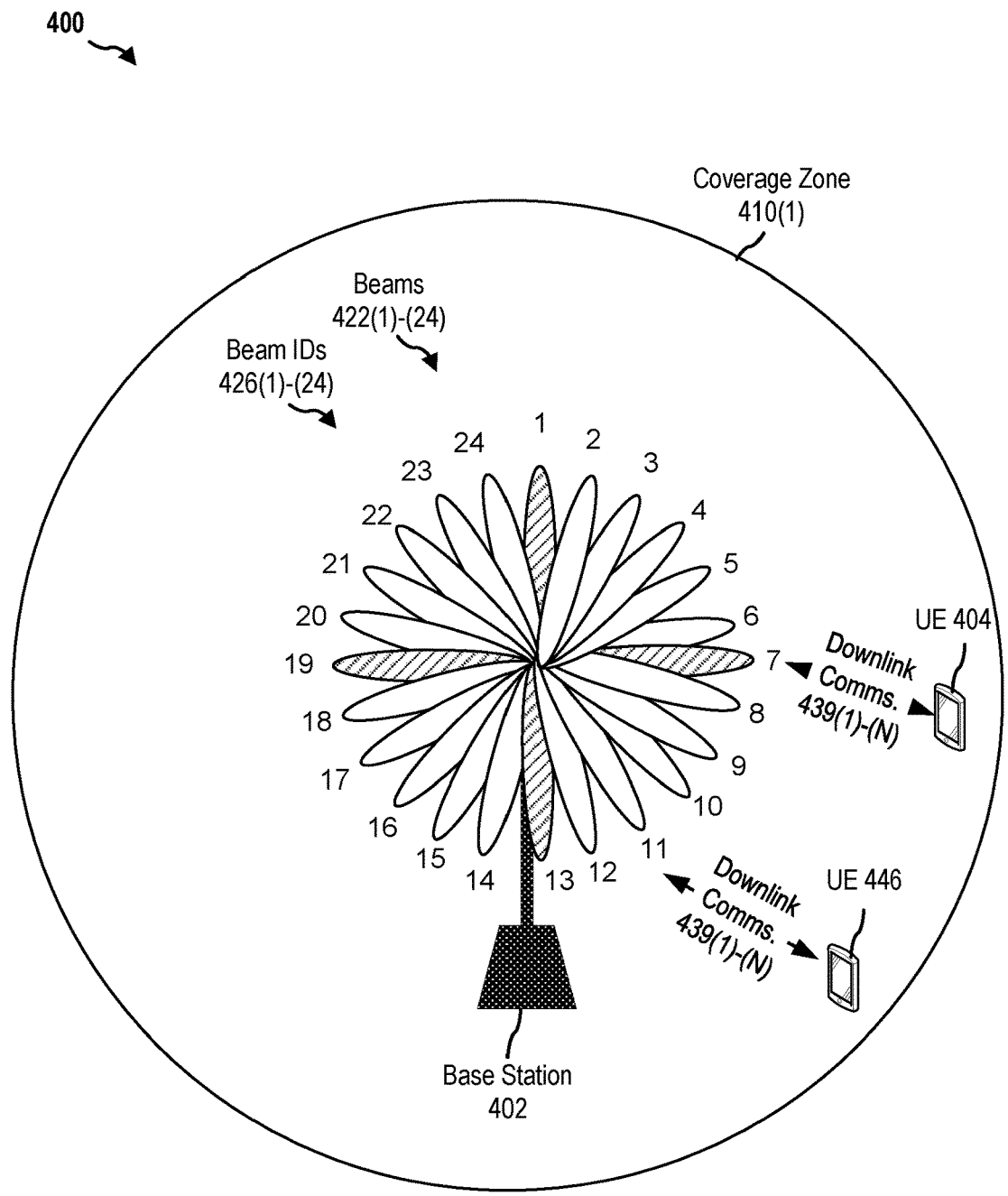
FIG. 4C is a diagram illustrating third example communications and components of a base station and UEs, in accordance with some aspects of the present disclosure.

FIG. 4A is a diagram illustrating a first example of communications and components of base stations and UEs. As illustrated in FIGS. 4A-4C, the system 400 may include a base station 402 (e.g., the base station 102/180) and a UE 404 (e.g., the UE 104 in an NR-RRC idle mode or NR-RRC connected mode). Further, the system 400 may include one or more other base stations 406 and/or one or more other UEs 408 configured to perform similar operations as the base station 402 and the UE 404, respectively. As described in detail herein, the base stations 402 and 406(1)-(n) and the UE 404 and 408(1)-(n) may be configured for beamformed wireless communications within a plurality of coverage zones 410(1)-(n) of the system 400. Further, each coverage zone 410 may be associated with a coverage zone identifier 412. For example, a first coverage zone 410(1) may be identified by a first coverage zone identifier 412(1), an nth coverage zone may be identified by an nth identifier, and so forth.

As illustrated in FIGS. 4A-4B, the base station 402 may include the beam prediction management component 198, a beam management component 414, a model generator 416, and one or more prediction models 418(1)-(n). The beam management component 414 may be configured to perform beam management processes at the base station 402. For example, the beam management component 414 may be configured to periodically transmit SSBs 420(1)-(n) on each of a plurality of transmit beams 422(1)-(n) of the base station 402 as a part of SSB bursts 424(1)-(n). In particular, the base station 402 may transmit a first SSB 420(1) on a first transmit beam 422(1) during a first SSB burst 424(1), an nth SSB 420(n) on the nth transmit beam 422(n) during the first SSB burst 424(1), the first SSB 420(1) on the first transmit beam 422(1) during an nth SSB burst 424(n), the nth SSB 420(n) on the nth transmit beam 422(n) during the nth SSB burst 424(n), and so forth. Each SSB burst 424(1)-(n) may have a SSB burst duration and occur in accordance with a periodic SSB burst period. Additionally, each transmit beam 422 may have a beam identifier 426. For example, the first transmit beam 422(1) may have a first beam identifier 426(1), an nth transmit beam 422(n) may have an nth beam identifier 426(n), and so forth.

The model generator 416 may be configured to generate the prediction models 418(1)-(n). In particular, the model generator 416 may receive a plurality of training measurement collections 428(1)-(n) from the UEs (e.g., the UE 404 and/or the UEs 408), and train the prediction models 418(1)-(n) based on the plurality of training measurement collections 428(1)-(n). For example, the beam management component 414 may transmit a plurality of sample beam identifiers 430(1)-(n) identifying a subset of the transmit beams 422(1)-(n). In addition, the beam management component 414 may transmit a plurality of SSBs 420 in a SSB burst 424 to the UEs. In response, the model generator 416 may receive the plurality of training measurement collections 428(1)-(n) corresponding to measurement values of the plurality of SSBs 420 as determined by the UEs.

In some aspects, each training measurement collection 428 may include a beam identifier and corresponding measurement value determined by the transmitting UE for a subset of the transmit beams 422. In particular, for each of the transmit beams 422 identified by the sample beam identifiers 430(1)-(n), an individual training measurement collection 428 may include the beam identifier and the measurement value determined by the UE. Further, for each of the transmit beams 422 meeting a predefined criteria (e.g., the three transmit beams 422 having one of the three highest measurement values), the individual training measurement collection 428 may include the beam identifier and the measurement value determined by the UE. In some aspects, the measurement values may be reference signal received power (RSRP) measurements. Further, in some aspects, an individual training measurement collection 428 may also include angular information (e.g., angle of arrival (AoA), angle of departure (AoD), etc.) for the subset of the transmit beams 422(1)-(n) represented within the individual training measurement collection 428.

In some aspects, the model generator 416 may be configured to generate neural network prediction models based on the plurality of training measurement collections 428(1)-(n). For instance, the prediction models 418 may be layered neural networks in which the output of a first layer of neurons becomes an input to a second layer of neurons, the output of the second layer of neurons becomes input to a third layer of neurons, and so forth. Further, the neural network prediction models may be trained to determine transmit beams expected to meet a predefined criteria based on a signature (e.g., a spatial signature) determined from a plurality of beam measurements. In some aspects, at least one of the prediction models 418 may be a feed-forward neural network. In some other instances, the prediction models 418 may be another type of machine learning or pattern recognition model.

Further, the beam prediction management component 198 may be configured to facilitate use of the prediction model 418 by the UEs for beam prediction, e.g., SSB beam prediction, as described in detail herein. As illustrated in FIG. 4A, the beam prediction management component 198 may transmit the prediction model 418 to UEs within a coverage zone 410 associated with the prediction model 418. For example, the beam prediction management component 198 of the base station 402 within the coverage zone 410(1) may transmit the prediction model 418(1) to the UE 404.

In addition, the beam prediction management component 198 may transmit the sample beam identifiers 430(1)-(n) to the UEs within the coverage zone 410. For example, the beam prediction management component 198 may transmit the sample beam identifiers 430(1)-(4) to the UE 404. Further, the beam management component may periodically transmit the plurality of SSBs 420(1)-(n) in SSB bursts 426(1)-(n) within the coverage zone 410. For example, the beam prediction management component 198 may periodically transmit the SSB bursts 426(1)-(n) to the UE 404 while the UE 404 is within the coverage zone 410(1). In response to receiving the sample beam identifiers 430(1)-(n) and the first SSB burst 424(1), the UEs may determine sample measurement values for the transmit beams 422 identified by the sample beam identifiers 430(1)-(n), and predict a plurality of predicted beams of the transmit beams 422 expected to meet a predefined criteria based on the sample measurement values and the prediction model 418(1). In addition, the UEs may measure the predicted beams to determine predicted beam measurement information and transmit reporting information 432(1)-(*n*) including the predicted beam measurement information. For example, the beam prediction management component 198 may receive the reporting information 432(1) from the UE 404. The reporting information 432 may include a beam identifier and corresponding measurement value determined by the transmitting UE for the transmit beams 422 determined by the prediction model 418 to meet a predefined criteria at the transmitting UE (i.e., the predicted beams). For example, for each of the three transmit beams 422 predicted to have one of the three highest RSRP values at the UE 404, the reporting information 432(1) may include the beam identifier and the RSRP measurement value determined by the UE 404.

Additionally, the base station 402 may include a reception component 434 and a transmission component 436. The reception component 434 may include, for example, a radio frequency (RF) receiver for receiving the signals described herein. The transmission component 436 may include, for example, an RF transmitter for transmitting the signals described herein. In an aspect, the reception component 434 and the transmission component 436 may be co-located in a transceiver (e.g., the transceiver 510 shown in FIG. 5).

As illustrated in FIG. 4A, the UE 404 may include the beam prediction component 140, the prediction models 418(1)-(*n*), a measurement component 438 configured to measure the transmit beams 422, and a reporting component 440 configured to report measurement values to the base stations (e.g., the base station 402 and the base stations 406(1)-(*n*)). In some aspects, the beam prediction component 140 may be configured to employ prediction models 418(1)-(*n*) received from a base station (e.g., the base stations 402 and the base stations 406(1)-(N)) to identify the transmit beams 422 predicted to meet a predefined criteria (e.g., the three transmit beams expected to have the highest RSRP measurement value).

For example, the beam prediction component 140(1) may receive the sample beam identifiers 430(1)-(4) from the base station 402 and periodically receive the SSBs 420(1)-(*n*) of the SSB bursts 424(1) via the transmit beams 422. In response, the beam prediction component 140(1) may instruct the measurement component 438(1) to measure only the transmit beams 422 corresponding to the sample beam identifiers 430(1)-(4). Further, the beam prediction component may input each of the sample beam identifiers 430(1)-(4) and the corresponding measurement value, as determined by the measurement component 438, into the prediction model 418 to determine the a number of transmit beams (e.g., three transmit beams) expected to have the highest RSRP measurement values. Additionally, the beam prediction component 140 may instruct the measurement component 438 to measure the three transmit beams expected to have the highest RSRP measurement values.

In addition, the reporting component 440 may transmit the reporting information 432(1) to the base station 402. In some aspects, the reporting component 440 may transmit the reporting information 432(1) within a CSI report. As described in detail above, the reporting information 432(1) may include a beam identifier and a measurement value for each of the three transmit beams expected to have the highest RSRP measurement values. In some aspects, the reporting information 432(1) may be utilized to facilitate communications between the base station 402 and the UE 404. For example, the base station 402 and the UE 404 may employ at least one of the transmit beams 422 identified in the reporting information 432(1) for downlink transmissions 441.

Further, the UE 404 may include a reception component 442 and a transmission component 444. The transmission component 444 may be configured to generate signals for transmission operations and sensing as described herein. The transmission component 444 may include, for example, a RF transmitter for transmitting the signals described herein. The reception component 442 may include, for example, a RF receiver for receiving the signals described herein. In an aspect, the reception component 442 and the transmission component 444 may be co-located in a transceiver (e.g., the transceiver 610 shown in FIG. 6).

FIG. 4B is a diagram illustrating a second example of communications and components of base stations and UEs. As illustrated in FIG. 4B, in some aspects, a UE 446 may not include a prediction model 418 for one or more coverage zones. The UE 446 may include the beam prediction component 140(2), the measurement component 438(2) configured to measure the transmit beams 422, the reporting component 440(2) configured to report measurement values to the base stations, the reception component 442(2), and the transmission component 444(2).

Further, the UE 446 may receive the sample beam identifiers 430(1)-(4) from the base station 402. In response, the beam prediction component 140(2) may instruct the measurement component 438(2) to measure only the transmit beams 422 corresponding to the sample beam identifiers 430(1)-(4) to determine sample measurement information 448 during a first SSB burst 424(1). Further, the beam prediction component 140(2) may transmit the sample measurement information 448 to the base station 402. In some aspects, the reporting component 440 may transmit the reporting information 432(1) within a CSI report. Further, in some aspects, the sample measurement information 448 may include a measurement value (e.g., RSRP measurement value) and beam identifier for each sample beam identifier 430 received from the base station 402.

Upon receipt of the sample measurement information 448, the beam prediction management component 198 may input the sample measurement information 448 into the prediction model 418(1) corresponding to the current coverage zone 410 associated with the UE 446 to determine a plurality of predicted beams of the transmit beams expected to meet a predefined criteria (e.g., the three transmit beams having one of the three highest measurement value). Further, the beam prediction management component 198 may transmit a measurement request 450 to the UE 446. The measurement request 450 may instruct the measurement component 438(2) to measure the plurality of predicted beams. For example, the measurement request 450(1) may include beam identifiers of the three transmit beams expected to have the highest measurement values. Upon receipt of the measurement request 450, the measurement component 438(2) may measure the three transmit beams identified in the measurement request 450 during a second SSB burst 424(2), and the reporting component 440(2) may transmit the reporting information 432(2) to the base station 402. In some aspects, the reporting component 440(2) may transmit the reporting information 432(2) within a CSI report. As described in detail above, the reporting information 432(2) may include a beam identifier and a measurement value for each of the transmit beams identified in the measurement request 450. In some aspects, the reporting information 432(2) may be utilized to facilitate communications between the base station 402 and the UE 446. For example, the base station 402 and the UE 404 may employ at least one of the transmit beams 422 identified in the reporting information 432(1) for downlink transmissions 441.

FIG. 4C is a diagram illustrating a third example of communications and components of base stations and UEs. As illustrated in FIG. 4C, the base station 402 may generate a plurality of transmit beams 422(1)-(24) each identified by one of the transmit beam identifiers 426(1)-(24). Although FIG. 4C illustrates the base station 402 generating twenty-four beams transmit beams, the base station 402 may generate any number of transmit beams.

Further, as described in detail herein, the sample beam identifiers 430(1)-(n) may be used to represent a subset of the transmit beams 422(1)-(n) having a lower amount of transmit beams than the full set of the transmit beams 422(1)-(n). For example, the sample beam identifiers 430 (1)-(4) may identify the first transmit beam 422(1), the seventh transmit beam 422(7), the thirteenth transmit beam 422(13), and the nineteenth transmit beam 422(19) of the base station 402. In addition, instead of attempting to blindly decode the SSBs 420(1)-(n) to measure the transmit beams 422(1)-(n), the UEs (e.g., the UE 404, the UE 446, etc.) may only attempt to blindly decode the SSBs 420 transmitted by the first transmit beam 422(1), the seventh transmit beam 422(7), the thirteenth transmit beam 422(13), and the nineteenth transmit beam 422(19). Further, the measurements of the first transmit beam 422(1), the seventh transmit beam 422(7), the thirteenth transmit beam 422(13), and the nineteenth transmit beam 422(19) may be input into the prediction model 418 to determine one or more of the transmit beams 422 meeting a predefined criteria. For example, the prediction model 418 may indicate that the sixth transmit beam 422(6), the seventh transmit beam 422(7), and the eight transmit beam 422(8) are expected to have the three highest measurement values at the UE 404, and the prediction model 418 may indicate that the tenth transmit beam 422(10), the eleventh transmit beam 422(11), and the twelfth transmit beam 422(12) are expected to have the three highest measurement values at the UE 446. As a result, the UE 404 may send reporting information 432(1) identifying the sixth transmit beam 422(6), the seventh transmit beam 422(7), and the eight transmit beam 422(8), and UE 446 may transmit the reporting information 432(2) identifying the sixth transmit beam 422(6), the seventh transmit beam 422(7), and the eight transmit beam 422(8).

Although FIGS. 4A-4C illustrate employing the beam prediction component 140, the beam prediction management component 198, prediction model 418, the measurement component 438, and the reporting component 440 for SSB beams, the present disclosure may also be applied to reducing the number of measurements made by a UE for other types of reference signals in beam management processes. For example, in some aspects, the beam prediction component 140, the beam prediction management component 198, the prediction model 418, the measurement component 438, and the reporting component 440 may employed to reduce the number of measurements of CSI-RSs.

Figure 5:
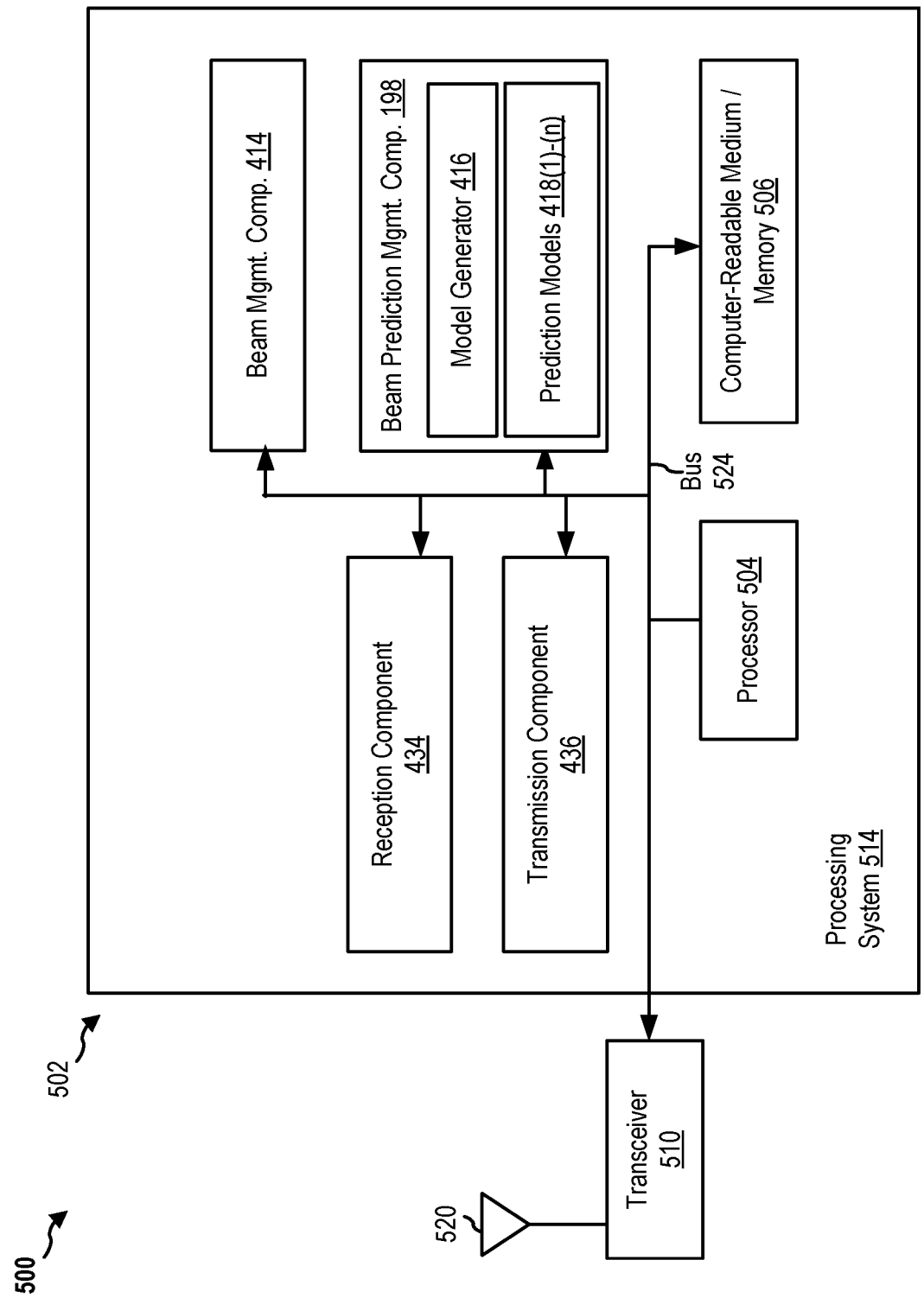
FIG. 5 is a diagram illustrating an example of a hardware implementation for a base station employing a processing system, in accordance with some aspects of the present disclosure.

FIG. 5 is a diagram 500 illustrating an example of a hardware implementation for a base station 502 (e.g., base station 402) employing a processing system 514. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the beam prediction management component 198, the beam management component 414, the model generator 416, and the computer-readable medium/memory 506. The bus 524 may also link various other circuits such as timing sources, peripherals, voltage regulators, and power management circuits, which are well known in the art, and therefore, will not be described any further.

The processing system 514 may be coupled with a transceiver 510. The transceiver 510 is coupled with one or more antennas 520. The transceiver 510 provides a means for communicating with various other apparatus over a transmission medium. The transceiver 510 receives a signal from the one or more antennas 520, extracts information from the received signal, and provides the extracted information to the processing system 514, specifically the reception component 434. The reception component 434 may receive the plurality of training measurement collections 428(1)-(n), the reporting information 432(1)-(n), and the sample measurement information 448. In addition, the transceiver 510 receives information from the processing system 514, specifically the transmission component 436, and based on the received information, generates a signal to be applied to the one or more antennas 520. Further, the transmission component 436 may send the prediction models 418(1)-(n), the SSBs 420(1)-(n), the SSB Bursts 424(1)-(n), the sample beam identifiers 430(1)-(n), the measurement requests 450 (1)-(n), and/or the downlink transmissions 441.

The processing system 514 includes a processor 504 coupled with a computer-readable medium/memory 506 (e.g., a non-transitory computer readable medium). The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes the beam prediction management component 198, the beam management component 414, the model generator 416, and the prediction models 418(1)-(n). The aforementioned components may be software components running in the processor 504, resident/stored in the computer readable medium/memory 506, one or more hardware components coupled with the processor 504, or some combination thereof. The processing system 514 may be a component of the base station 310 and may include the memory 376 and/or at least one of the TX processor 316, the RX processor 370, and the controller/processor 375. Alternatively, the processing system 514 may be the entire base station (e.g., see 310 of FIG. 3, 402 of FIG. 4).

The aforementioned means may be one or more of the aforementioned components of the base station 502 and/or the processing system 514 of the base station 502 configured to perform the functions recited by the aforementioned means. As described supra, the processing system 514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 6:
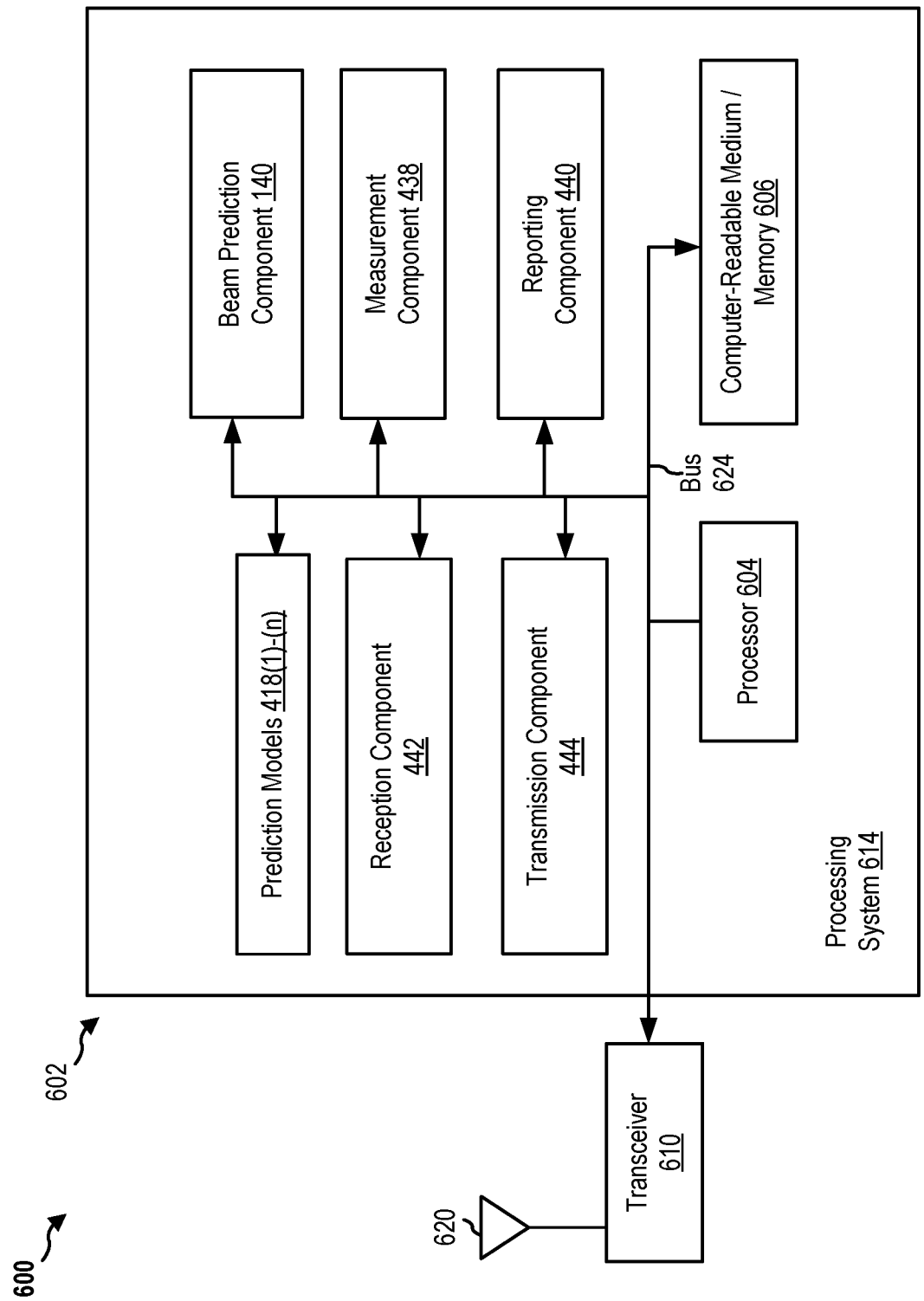
FIG. 6 is a diagram illustrating an example of a hardware implementation for a UE employing a processing system, in accordance with some aspects of the present disclosure.

FIG. 6 is a diagram 600 illustrating an example of a hardware implementation for a UE 602 (e.g., the UE 104, the UE 404, etc.) employing a processing system 614. The processing system 614 may be implemented with a bus architecture, represented generally by the bus 624. The bus 624 may include any number of interconnecting buses and/or bridges depending on the specific application of the processing system 614 and the overall design constraints. The bus 624 links together various circuits including one or more processors and/or hardware components, represented by the processor 604, the beam prediction component 140, the measurement component 438, and reporting component 440, and the computer-readable medium (e.g., non-transitory computer-readable medium)/memory 606. The bus 624 may also link various other circuits such as timing sources, peripherals, voltage regulators, and power management circuits, which are well known in the art, and therefore, will not be described any further.

The processing system 614 may be coupled with a transceiver 610. The transceiver 610 may be coupled with one or more antennas 620. The transceiver 610 provides a means for communicating with various other apparatus over a transmission medium. The transceiver 610 receives a signal from the one or more antennas, extracts information from the received signal, and provides the extracted information to the processing system 614, specifically the reception component 434. The reception component 434 may receive the prediction models 418(1)-(n), the SSBs 420(1)-(n), the SSB Bursts 424(1)-(n), the sample beam identifiers 430(1)-(n), the measurement requests 450(1)-(n), and/or the downlink transmissions 441. In addition, the transceiver 610 receives information from the processing system 614, specifically the transmission component 436, and based on the received information, generates a signal to be applied to the one or more antennas. Further, the transmission component 436 may transmit the plurality of training measurement collections 428(1)-(n), the reporting information 432(1)-(n), and the sample measurement information 448.

The processing system 614 includes a processor 604 coupled with a computer-readable medium/memory 606 (e.g., a non-transitory computer readable medium). The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the beam prediction component 140, the prediction models 418(1)-(n), the measurement component 438, and the reporting component 440. The aforementioned components may be a software component running in the processor 604, resident/stored in the computer readable medium/memory 606, one or more hardware components coupled with the processor 604, or some combination thereof. The processing system 614 may be a component of the UE 390 and may include the memory 360 and/or at least one of the TX processor 368, the RX processor 356, and the controller/processor 359. Alternatively, the processing system 614 may be the entire UE (e.g., see 390 of FIG. 3, 404 of FIG. 4).

The aforementioned means may be one or more of the aforementioned components of the UE 602 and/or the processing system 614 of UE 602 configured to perform the functions recited by the aforementioned means. As described supra, the processing system 614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 7:
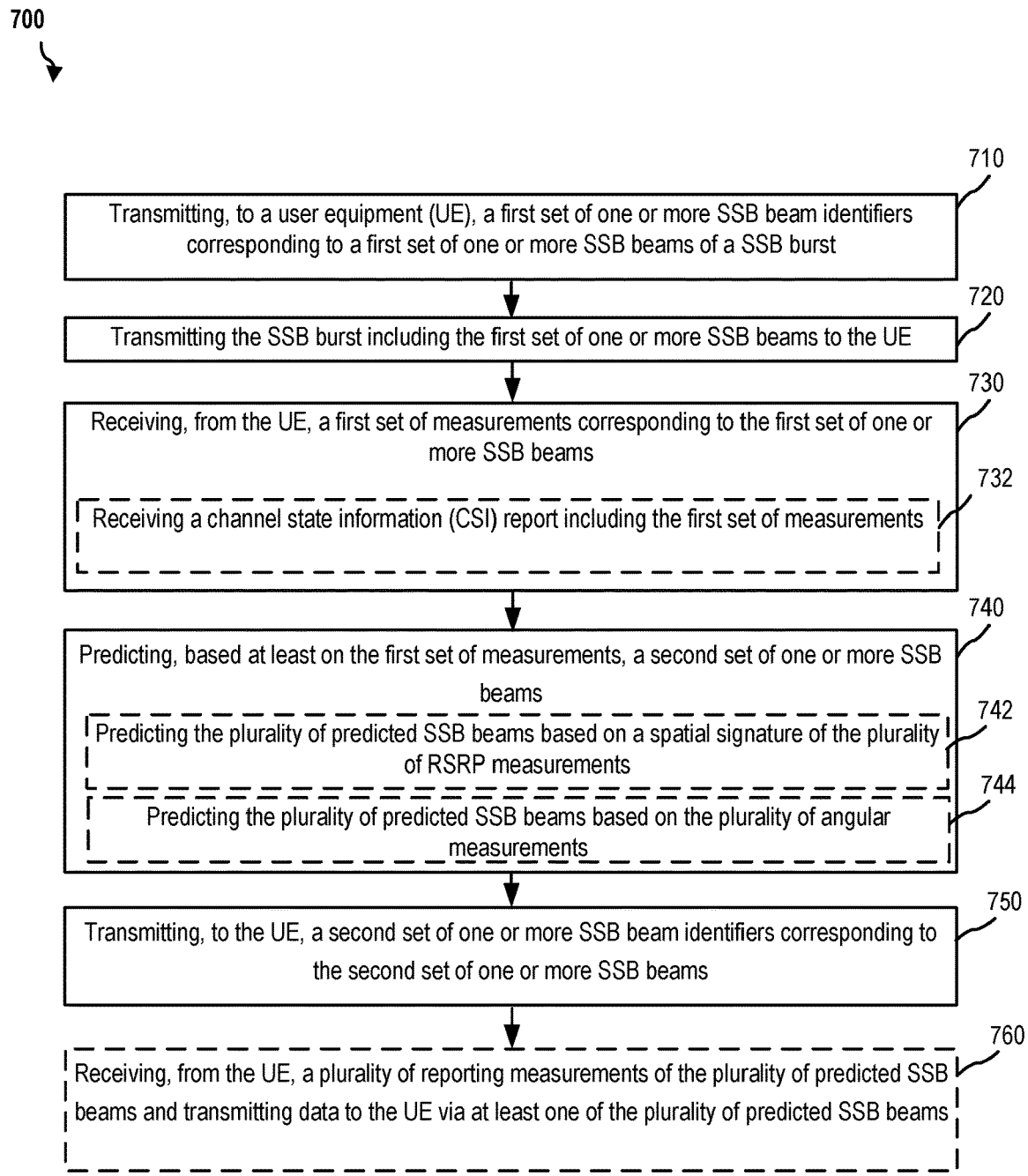
FIG. 7 is a flowchart of an example method of implementing predictive methods for SSB beam measurements at a base station, in accordance with some aspects of the present disclosure.

FIG. 7 is a flowchart of a method 700 of implementing predictive methods for SSB beam measurements, in accordance with some aspects of the present disclosure. The method may be performed by a base station (e.g., the base station 102, which may include the memory 376 and which may be the entire base station or a component of the base station, such as beam prediction management component 198, the TX processor 316, the RX processor 370, and/or the controller/processor 375; the base station 402, the base station 702).

At block 710, the method 700 may include transmitting, to UE, a first set of one or more SSB beam identifiers corresponding to a first set of one or more SSB beams of a SSB burst. For example, the beam prediction management component 198 may transmit the sample beam identifiers 430(1)-(4) to the UE 446. Further, the sample beam identifiers 430(1)-(4) may identify the first transmit beam 422(1), the seventh transmit beam 422(7), the thirteenth transmit beam 422(13), and the nineteenth transmit beam 422(19) of the base station 402.

Accordingly, the base station 102, the base station 402, the base station 802, the TX processor 316, the RX processor 370, and/or the controller/processor 375 executing the beam prediction management component 198 may provide means for transmitting, to a UE, a first set of one or more SSB beam identifiers corresponding to a first set of one or more SSB beams of a SSB burst.

At block 720, the method 700 may include transmitting the SSB burst including the first set of one or more SSB beams to the UE. For example, the base station 402 may transmit the plurality of SSBs 420 in a SSB burst 442(1) to the UE 446 via the transmit beams 422(1)-(24).

Accordingly, the base station 102, the base station 402, the base station 802, the RX processor 370, and/or the controller/processor 375 executing the beam management component 414 may provide means for transmitting the SSB burst including the first set of one or more SSB beams to the UE.

At block 730, the method 700 may include receiving, from the UE, a first set of measurements corresponding to the first set of one or more SSB beams. For example, the base station 402 may receive the sample measurement information 448 from the UE 446. Further, the sample measurement information 448 may include measurement values corresponding to the first transmit beam 422(1), the seventh transmit beam 422(7), the thirteenth transmit beam 422(13), and the nineteenth transmit beam 422(19) of the base station 402.

At sub-block 732, the block 730 may optionally include receiving a channel state information (CSI) report including a first set of measurements. For example, the base station 402 may transmit a CSI report including the sample measurement information 448.

Accordingly, the base station 102, the base station 402, the base station 802, the RX processor 370, and/or the controller/processor 375 executing the beam prediction management component 198 may provide means for receiving, from the UE, a first set of measurements corresponding to the first set of one or more SSB beams.

At block 740, the method 700 may include predicting, based at least on the first set of measurements, a second set of one or more SSB beams. For example, the base station 402 may input the sample measurement information 448 into the prediction model 418(1) to determine the transmit beams 422 of the base station 402 expected to meet a predefined criteria, e.g., the three beams expected to have the highest measurement values of a particular type of measurement performed by the UE 446. In some aspects, the prediction model 418(1) may determine a subset of the transmit beams 422 expected to have the highest measurement values of a particular type of measurement performed by the UE 446 based on a signature (e.g., a spatial signature) formed by the measurement values included within the sample measurement information 448.

At sub-block 742, the block 740 may optionally include predicting the second set of one or more SSB beams based on a spatial signature of one or more RSRP measurements. For example, in some aspects, the sample measurement information 448 includes RSRP measurements, and the prediction model 418(1) is configured to determine a subset of the transmit beams 422 expected to have the highest RSRP values when measured by the UE 446 based on a spatial signature formed by the measurement values included within the sample measurement information 448.

At sub-block 744, the block 740 may optionally include predicting the second set of one or more SSB beams based on one or more angular measurements. For example, in some aspects, the prediction model 418(1) is configured to determine a subset of the transmit beams 422 expected to have the highest measurement values when measured by the UE 446 based at least in part on angular information. In some instances, the angular information may include AoA information associated with the first transmit beam 422(1), the seventh transmit beam 422(7), the thirteenth transmit beam 422(13), and the nineteenth transmit beam 422(19). Additionally, or alternatively, the angular information may include AoD information associated with the first transmit beam 422(1), the seventh transmit beam 422(7), the thirteenth transmit beam 422(13), and the nineteenth transmit beam 422(19) of the base station 402). Further, the angular information may be provided by the UE 446 within the sample measurement information 448(1) and/or by the beam management component 414 that manages the transmit beams 422. Further, base station 402 may the input the sample measurement information 448 and the angular information into the prediction model 418(1) to determine a subset of the transmit beams 422 expected to meet a predefined criteria when measured by the UE 446.

Accordingly, the base station 102, the base station 402, the base station 802, the RX processor 370, and/or the controller/processor 375 executing the beam prediction management component 198 may provide means for predicting, based at least on the first set of measurements, a second set of one or more SSB beams.

At block 750, the method 700 may include transmitting, to the UE, a second set of one or more SSB beam identifiers corresponding to the second set of one or more SSB beams. For example, the base station 402 may transmit a measurement request 450 to the UE 446. Further, the measurement request 450(1) may include beam identifiers of the three transmit beams expected to have the highest measurement values.

Accordingly, the base station 102, the base station 402, the base station 802, the RX processor 370, and/or the controller/processor 375 executing the beam prediction management component 198 may provide means for transmitting, to the UE, a second set of one or more SSB beam identifiers corresponding to the second set of one or more SSB beams.

At block 760, the method 700 may optionally include receiving, from the UE, reporting information for the second set of one or more SSB beams and transmitting data to the UE via at least one of the second set of one or more SSB beams. For example, the base station 402 may receive reporting information 432(2) from the UE 446. In some aspects, the UE 446 may transmit the reporting information 432(2) within a CSI report.

Accordingly, the base station 102, the base station 402, the base station 802, the RX processor 370, and/or the controller/processor 375 executing the beam prediction management component 198 may provide means for receiving, from the UE, reporting information for the second set of one or more SSB beams and transmitting data to the UE via at least one of the second set of one or more SSB beams.

In an additional aspect, the method 700 further comprises transmitting a third set of one or more SSB beams, receiving, from one or more UEs, based on the third set of one or more SSB beams, one or more training measurements for generating the prediction model, and generating the prediction model based on the one or more training measurements. For example, the beam management component 414 may transmit a SSB burst 424 to the UEs (e.g., the UE 404, the UEs 408(1)-(n), and the UE 446), and receive the plurality of training measurement collections 428 from the UEs. Further, the model generator 416 may generate the prediction model 418(1) based on the plurality of training measurement collections 428. Accordingly, the UE 104, the UE 404, UE 602, the TX processor 368, the RX processor 356, and/or the controller/processor 359 executing the beam prediction component 140 may provide means for transmitting a third set of one or more SSB beams, receiving, from one or more UEs, based on the third set of one or more SSB beams, one or more training measurements for generating the prediction model, and generating the prediction model based on the one or more training measurements.

Figure 8:
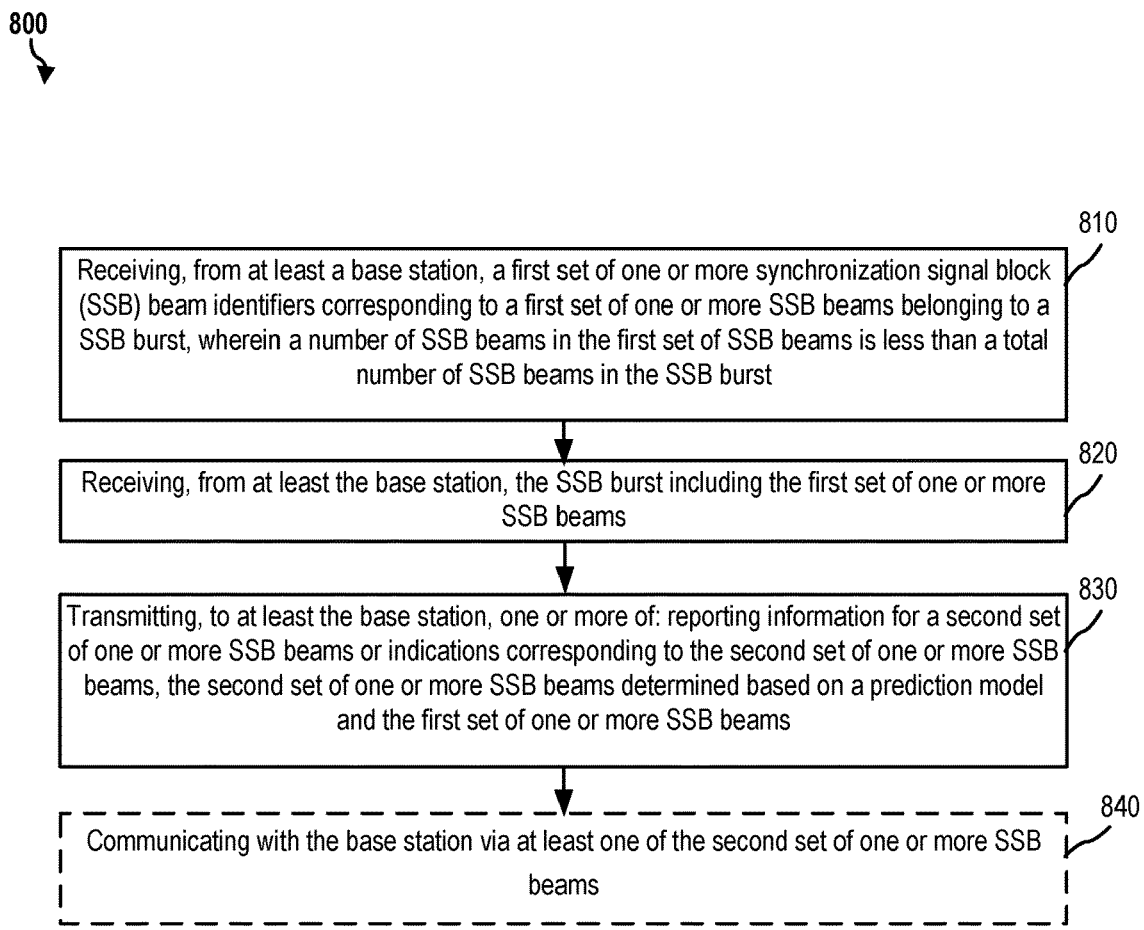
FIG. 8 is a flowchart of an example method of implementing predictive methods for SSB beam measurements at a UE, in accordance with some aspects of the present disclosure.

FIG. 8 is a flowchart of a method 800 of implementing predictive methods for SSB beam measurements, in accordance with some aspects of the present disclosure. The method may be performed by a UE (e.g., the UE 104 of FIGS. 1 and 3, which may include the memory 360 and which may be the entire UE 104 or a component of the UE 104, such as beam prediction component 140, the TX processor 368, the RX processor 356, and/or the controller/processor 359; the UE 404 of FIG. 4; and/or the UE 602 of FIG. 8).

At block 810, the method 800 may include receiving, from at least a base station, a first set of one or more synchronization signal block (SSB) beam identifiers corresponding to a first set of one or more SSB beams belonging to a SSB burst, wherein a number of SSB beams in the first set of SSB beams is less than a total number of SSB beams in the SSB burst. For example, the beam prediction component 140(1) may receive the sample beam identifiers from the base station 402. Further, the sample beam identifiers 430(1)-(4) may identify the first transmit beam 422(1), the seventh transmit beam 422(7), the thirteenth transmit beam 422(13), and the nineteenth transmit beam 422(19) of the base station 402.

Accordingly, the UE 104, the UE 404, UE 602, the TX processor 368, the RX processor 356, and/or the controller/processor 359 executing the beam prediction component 140 may provide means for receiving, from at least a base station, a first set of one or more synchronization signal block (SSB) beam identifiers corresponding to a first set of one or more SSB beams belonging to a SSB burst, wherein a number of SSB beams in the first set of SSB beams is less than a total number of SSB beams in the SSB burst.

At block 820, the method 800 may include receiving, from at least the base station, the SSB burst including the first set of one or more SSB beams. For example, the UE 404 may receive the SSBs 420(1)-(*n*) of the SSB bursts 424(1) via the transmit beams 422.

Accordingly, the UE 104, the UE 404, UE 602, the TX processor 368, the RX processor 356, and/or the controller/processor 359 executing the measurement component 438 may provide means for receiving, from at least the base station, the SSB burst including the first set of one or more SSB beams.

At block 830, the method 800 may include transmitting, to at least the base station, one or more of: reporting information for a second set of one or more SSB beams or indications corresponding to the second set of one or more SSB beams, the second set of one or more SSB beams determined based on a prediction model and the first set of one or more SSB beams. For example, the UE 404 may transmit the reporting information 432(1) to the base station 402. In some aspects, the UE 404 may transmit the reporting information 432(1) within a CSI report.

Accordingly, the UE 104, the UE 404, UE 602, the TX processor 368, the RX processor 356, and/or the controller/processor 359 executing the reporting component 440 may provide means for transmitting, to at least the base station, one or more of: reporting information for a second set of one or more SSB beams or indications corresponding to the second set of one or more SSB beams, the second set of one or more SSB beams determined based on a prediction model and the first set of one or more SSB beams.

At block 840, the method 800 may optionally include communicating with the base station via at least one of the second set of one or more SSB beams. For example, the UE may receive the DL transmissions 441 via the plurality of predicted SSB beams.

Accordingly, the UE 104, the UE 404, UE 602, the TX processor 368, the RX processor 356, and/or the controller/processor 359 may provide means for communicating with the base station via at least one of the second set of one or more SSB beams.

In an additional aspect, the method 800 further comprises determining the second set of one or more SSB beams based on at least one of a plurality of reference signal received power (RSRP) measurements, a plurality of angular measurements, historic measurement information, or a spatial signature. For example, the UE 404 may determine that the sample beam identifiers 430(1)-(4) correspond to the first transmit beam 422(1), the seventh transmit beam 422(7), the thirteenth transmit beam 422(13), and the nineteenth transmit beam 422(19) of the base station 402. Further, the measurement component 438 may measure the first transmit beam 422(1), the seventh transmit beam 422(7), the thirteenth transmit beam 422(13), and the nineteenth transmit beam 422(19) of the base station 402. In some aspects, the UE 404 may determine RSRP measurements for the first transmit beam 422(1), the seventh transmit beam 422(7), the thirteenth transmit beam 422(13), and the nineteenth transmit beam 422(19) of the base station 402. Additionally, in some aspects, the UE may determine angular information of the first transmit beam 422(1), the seventh transmit beam 422(7), the thirteenth transmit beam 422(13), and the nineteenth transmit beam 422(19) of the base station 402.

In addition, the UE 404 may input the measurement information of the first transmit beam 422(1), the seventh transmit beam 422(7), the thirteenth transmit beam 422(13), and the nineteenth transmit beam 422(19) into the prediction model 418(1) to determine a subset of the transmit beams 422 expected to meet a predefined criteria, e.g., the three beams expected to have the highest measurement values of a particular type of measurement performed by the UE 404. In some aspects, the prediction model 418(1) may determine three beams expected to have the highest measurement values of a particular type of measurement performed by the UE 404 based on a signature (e.g., a spatial signature) formed by the measurement values of the first transmit beam 422(1), the seventh transmit beam 422(7), the thirteenth transmit beam 422(13), and the nineteenth transmit beam 422(19). In some aspects, the sample measurement information 448 includes RSRP measurements, and the prediction model 418(1) is configured to determine a subset of the transmit beams 422 expected to have the highest RSRP values when measured by the UE 404 based on a spatial signature formed by the measurement values of the first transmit beam 422(1), the seventh transmit beam 422(7), the thirteenth transmit beam 422(13), and the nineteenth transmit beam 422(19). In some aspects, the prediction model 418(1) is configured to determine a subset of the transmit beams 422 expected to have the highest measurement values when measured by the UE 404 based at least in part on angular information. In some instances, the angular information may include AoA information associated with the first transmit beam 422(1), the seventh transmit beam 422(7), the thirteenth transmit beam 422(13), and the nineteenth transmit beam 422(19). Additionally, or alternatively, the angular information may include AoD information associated with the first transmit beam 422(1), the seventh transmit beam 422(7), the thirteenth transmit beam 422(13), and the nineteenth transmit beam 422(19) of the base station 402). Further, the angular information may be determined by the measurement component and/or provided by the base station 402. Additionally, the UE 404 may the input the measurement values and the angular information into the prediction model 418(1) to determine the subset of the transmit beams 422 expected to meet a predefined criteria when measured by the UE 404.

Accordingly, the UE 104, the UE 404, UE 602, the TX processor 368, the RX processor 356, and/or the controller/processor 359 executing the beam prediction component 140 may provide means for determining the second set of one or more SSB beams based on at least one of a plurality of reference signal received power (RSRP) measurements, a plurality of angular measurements, historic measurement information, or a spatial signature.

In an additional aspect, the method 800 further comprises generating one or more measurements of the first set of one or more SSB beams. For example, the measurement component 438 may measure the first transmit beam 422(1), the seventh transmit beam 422(7), the thirteenth transmit beam 422(13), and the nineteenth transmit beam 422(19) of the base station 402. In some aspects, the UE 404 may determine RSRP measurements for the first transmit beam 422(1), the seventh transmit beam 422(7), the thirteenth transmit beam 422(13), and the nineteenth transmit beam 422(19) of the base station 402. Additionally, in some aspects, the UE may determine angular information of the first transmit beam 422(1), the seventh transmit beam 422(7), the thirteenth transmit beam 422(13), and the nineteenth transmit beam 422(19) of the base station 402.

Accordingly, the UE 104, the UE 404, UE 602, the TX processor 368, the RX processor 356, and/or the controller/processor 359 executing the measurement component 438 may provide means generating one or more measurements of the first set of one or more SSB beams.

In an additional aspect, the method 800 further comprises generating reporting information for the second set of one or more SSB beams. For example, the UE 404 may generate the reporting information 432(1) including measurement values for the first transmit beam 422(1), the seventh transmit beam 422(7), the thirteenth transmit beam 422(13), and the nineteenth transmit beam 422(19) of the base station 402.

Accordingly, the UE 104, the UE 404, UE 602, the TX processor 368, the RX processor 356, and/or the controller/processor 359 executing the measurement component 438 may provide means for generating reporting information for the second set of one or more SSB beams.

In an additional aspect, the method 800 further comprises identifying a coverage zone associated with a current location of the UE, and determining the prediction model is associated with the coverage zone, wherein determining the second set of one or more SSB beams based on the prediction model and the first set of one or more SSB beams further comprises determining the second set of one or more SSB beams in response to determining the prediction model is associated with the coverage zone. For example, UE 404 may determine that the UE 404 is located in the coverage zone 410(1), and determine that the prediction model 418(1) is associated with the coverage zone 410(1). Further, the UE 404 may employ the prediction model 418(1) to determine the plurality of predicted beams. In addition, if the UE 404 were to move to the coverage zone 410(2), the UE 404 may determine that the prediction model 418(2) is associated with the coverage zone 410(2) and use the prediction model 418(2) to determine a second plurality of predicted beams of a base station 406(1) within the coverage zone 410(2). Accordingly, the UE 104, the UE 404, UE 602, the TX processor 368, the RX processor 356, and/or the controller/processor 359 executing the beam prediction component 140 may provide means for identifying a coverage zone associated with a current location of the UE, and determining the prediction model is associated with the coverage zone, wherein determining the second set of one or more SSB beams based on the prediction model and the first set of one or more SSB beams further comprises determining the second set of one or more SSB beams in response to determining the prediction model is associated with the coverage zone.

In an additional aspect, the method 800 further comprises receiving, from at least the base station, a third set of one or more SSB beams, generating, based on the third set of one or more beams, one or more of training measurements for generating the prediction model, and transmitting the one or more of training measurements to the base station. For example, the beam management component 414 may transmit a SSB burst 424 to the UE 404, and the UE 404 may determine the training measurement collection 428(1) based on SSB burst 224. Further, the UE 404 may transmit the training measurement collection 428(1) to the base station 402. Accordingly, the UE 104, the UE 404, UE 602, the TX processor 368, the RX processor 356, and/or the controller/processor 359 executing the beam prediction component 140, the measurement component 438, and/or the reporting component 440 may provide means for receiving, from at least the base station, a third set of one or more SSB beams, generating, based on the third set of one or more beams, one or more of training measurements for generating the prediction model, and transmitting the one or more of training measurements to the base station.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE CLAUSES

A. A method of wireless communication at a user equipment (UE), the method comprising: receiving, from at least a base station, a first set of one or more synchronization signal block (SSB) beam identifiers corresponding to a first set of one or more SSB beams belonging to a SSB burst, wherein a number of SSB beams in the first set of one or more SSB beams is less than a total number of SSB beams in the SSB burst; receiving, from at least the base station, the SSB burst including the first set of one or more SSB beams; and transmitting, to at least the base station, one or more of: reporting information for a second set of one or more SSB beams or indications corresponding to the second set of one or more SSB beams, the second set of one or more SSB beams determined based on a prediction model and the first set of one or more SSB beams.

B. The method as paragraph A recites, further comprising generating reporting information for the second set of one or more SSB beams.

C. The method as any of paragraphs A-B recite, wherein determining the second set of one or more SSB beams based on the prediction model and the first set of one or more SSB beams comprises determining the second set of one or more SSB beams based on at least one of one or more reference signal received power (RSRP) measurements, one or more angular measurements, historic measurement information, or a spatial signature.

D. The method as any of paragraphs A-C recite, wherein the prediction model is configured to predict one or more SSB beams having highest measurement values within the SSB burst.

E. The method as any of paragraphs A-D recite, further comprising receiving the prediction model from the base station.

F. The method as any of paragraphs A-G recite, further comprising: identifying a coverage zone associated with a current location of the UE; and determining the prediction model is associated with the coverage zone, wherein determining the second set of one or more SSB beams based on the prediction model and the first set of one or more SSB beams further comprises determining the second set of one or more SSB beams in response to determining the prediction model is associated with the coverage zone.

G. The method as any of paragraphs A-F recite, wherein the prediction model is a neural network.

H. The method as any of paragraphs A-G recite, further comprising: receiving, from at least the base station, a third set of one or more SSB beams; generating, based on the third set of one or more SSB beams, one or more of training measurements for generating the prediction model; and transmitting the one or more of training measurements to the base station.

I. The method as any of paragraphs A-H recite, further comprising communicating with the base station via at least one of the second set of one or more SSB beams.

J. A UE for wireless communication, comprising a memory storing computer-executable instructions; and at least one processor coupled with the memory and configured to execute the computer-executable instructions to perform the method of any of paragraphs A-I.

K. A UE for wireless communication, comprising means for performing the method of any of paragraphs A-I.

L. A non-transitory computer-readable medium storing computer executable code, the code when executed by a processor causes the processor to perform the method of any of paragraphs A-I.

M. A method of wireless communication at a base station, the method comprising: transmitting, to a user equipment (UE), a first set of one or more SSB beam identifiers corresponding to a first set of one or more SSB beams of a SSB burst; transmitting the SSB burst including the first set of one or more SSB beams to the UE; receiving, from the UE, a first set of measurements corresponding to the first set of one or more SSB beams; predicting, based at least on the first set of measurements, a second set of one or more SSB beams; and transmitting, to the UE, a second set of one or more SSB beam identifiers corresponding to the second set of one or more SSB beams.

N. The method as paragraph M recites, wherein receiving the first set of measurements, comprises receiving a channel state information (CSI) report including the first set of measurements.

O. The method as any of paragraphs M-N recite, wherein predicting, based at least on the first set of measurements, the second set of one or more SSB beams comprises predicting the second set of one or more SSB beams based on at least one of a plurality of reference signal received power (RSRP) measurements, a plurality of angular measurements, or historic measurement information.

P. The method as any of paragraphs M-N recite, wherein predicting, based at least on the first set of measurements, a second set of one or more SSB beams comprises predicting the second set of one or more SSB beams based on a spatial signature.

Q. The method as any of paragraphs M-P recite, wherein predicting the second set of one or more SSB beams comprises determining, via a prediction model, one or more SSB beams having highest measurement values within the SSB burst.

R. The method as paragraph Q recites, further comprising: transmitting a third set of one or more SSB beams; receiving, from one or more UEs, based on the third set of one or more SSB beams, one or more training measurements for generating the prediction model; and generating the prediction model based on the one or more training measurements.

S. The method as paragraph Q recites, wherein the UE is a first UE, and further comprising transmitting, to a second UE, the prediction model and a coverage zone identifier identifying a coverage zone for using the prediction model.

T. The method as paragraph Q recites, wherein the prediction model is a neural network.

U. The method as any of paragraphs M-U recite, further comprising: receiving, from the UE, reporting information for the second set of one or more SSB beams; and transmitting data to the UE via at least one of the second set of one or more SSB beams.

V. A base station for wireless communication, comprising a memory storing computer-executable instructions; and at least one processor coupled with the memory and configured to execute the computer-executable instructions to perform the method of any of paragraphs M-U.

W. A base station for wireless communication, comprising means for performing the method of any of paragraphs M-U.

X. A non-transitory computer-readable medium storing computer executable code, the code when executed by a processor causes the processor to perform the method of any of paragraphs M-U.

What is claimed is:

1. A method of wireless communication at a user equipment (UE), the method comprising:
   receiving, from at least a base station, a first set of one or more synchronization signal block (SSB) beam identifiers corresponding to a first set of one or more SSB beams belonging to a SSB burst, wherein a number of SSB beams in the first set of one or more SSB beams is less than a total number of SSB beams in the SSB burst;
   receiving, from at least the base station, the SSB burst including the first set of one or more SSB beams; and
   transmitting, to at least the base station, one or more of: reporting information for a second set of one or more SSB beams or indications corresponding to the second set of one or more SSB beams, the second set of one or more SSB beams determined based on a prediction model and the first set of one or more SSB beams.

2. The method of claim 1, further comprising generating reporting information for the second set of one or more SSB beams.

3. The method of claim 1, wherein determining the second set of one or more SSB beams based on the prediction model and the first set of one or more SSB beams comprises determining the second set of one or more SSB beams based on at least one of one or more reference signal received power (RSRP) measurements, one or more angular measurements, historic measurement information, or a spatial signature.

4. The method of claim 1, wherein the prediction model is configured to predict one or more SSB beams having highest measurement values within the SSB burst.

5. The method of claim 1, further comprising receiving the prediction model from the base station.

6. The method of claim 1, further comprising:
identifying a coverage zone associated with a current location of the UE; and
determining the prediction model is associated with the coverage zone,
wherein determining the second set of one or more SSB beams based on the prediction model and the first set of one or more SSB beams further comprises determining the second set of one or more SSB beams in response to determining the prediction model is associated with the coverage zone.

7. The method of claim 1, wherein the prediction model is a neural network.

8. The method of claim 1, further comprising:
receiving, from at least the base station, a third set of one or more SSB beams;
generating, based on the third set of one or more SSB beams, one or more of training measurements for generating the prediction model; and
transmitting the one or more of training measurements to the base station.

9. The method of claim 1, further comprising communicating with the base station via at least one of the second set of one or more SSB beams.

10. A user equipment (UE) for wireless communication, comprising:
a memory storing computer-executable instructions; and
at least one processor coupled with the memory and configured to execute the computer-executable instructions to:
receive, from at least a base station, a first set of one or more synchronization signal block (SSB) beam identifiers corresponding to a first set of one or more SSB beams belonging to a SSB burst, wherein a number of SSB beams in the first set of one or more SSB beams is less than a total number of SSB beams in the SSB burst;
receive, from at least the base station, the SSB burst including the first set of one or more SSB beams; and
transmit, to at least the base station, one or more of:
reporting information for a second set of one or more SSB beams or indications corresponding to the second set of one or more SSB beams, the second set of one or more SSB beams determined based on a prediction model and the first set of one or more SSB beams.

11. The UE of claim 10, wherein the at least one processor is further configured to execute the computer-executable instructions to generate the reporting information for the second set of one or more SSB beams.

12. The UE of claim 10, wherein determining the second set of one or more SSB beams based on the prediction model and the first set of one or more beams, the at least one processor is further configured to execute the computer-executable instructions to determine the second set of one or more SSB beams based on at least one of one or more reference signal received power (RSRP) measurements, one or more angular measurements, historic measurement information, or a spatial signature.

13. The UE of claim 10, wherein the prediction model is configured to predict one or more SSB beams having a highest measurement value within the SSB burst.

14. The UE of claim 10, wherein the SSB burst is a first SSB burst, and the at least one processor is further configured to execute the computer-executable instructions to:
receive, from at least the base station, a third set of one or more SSB beams;
generate, based on the third set of one or more SSB beams, one or more training measurements for generating the prediction model; and
transmit the one or more training measurements to the base station.

15. The UE of claim 10, wherein the at least one processor is further configured to execute the computer-executable instructions to communicate with the base station via at least one of the second set of one or more SSB beams.

16. A method of wireless communication at a base station, the method comprising:
transmitting, to a user equipment (UE), a first set of one or more SSB beam identifiers corresponding to a first set of one or more SSB beams of a SSB burst;
transmitting the SSB burst including the first set of one or more SSB beams to the UE;
receiving, from the UE, a first set of measurements corresponding to the first set of one or more SSB beams;
predicting, based at least on the first set of measurements, a second set of one or more SSB beams; and
transmitting, to the UE, a second set of one or more SSB beam identifiers corresponding to the second set of one or more SSB beams.

17. The method of claim 16, wherein receiving the first set of measurements, comprises receiving a channel state information (CSI) report including the first set of measurements.

18. The method of claim 16, wherein predicting, based at least on the first set of measurements, the second set of one or more SSB beams comprises predicting the second set of one or more SSB beams based on at least one of a plurality of reference signal received power (RSRP) measurements, a plurality of angular measurements, or historic measurement information.

19. The method of claim 16, wherein predicting, based at least on the first set of measurements, a second set of one or more SSB beams comprises predicting the second set of one or more SSB beams based on a spatial signature.

20. The method of claim 16, wherein predicting the second set of one or more SSB beams comprises determining, via a prediction model, one or more SSB beams having highest measurement values within the SSB burst.

21. The method of claim 20, further comprising:
transmitting a third set of one or more SSB beams;
receiving, from one or more UEs, based on the third set of one or more SSB beams, one or more training measurements for generating the prediction model; and
generating the prediction model based on the one or more training measurements.

22. The method of claim 20, wherein the UE is a first UE, and further comprising transmitting, to a second UE, the prediction model and a coverage zone identifier identifying a coverage zone for using the prediction model.

23. The method of claim 20, wherein the prediction model is a neural network.

24. The method of claim 16, further comprising:
receiving, from the UE, reporting information for the second set of one or more SSB beams; and
transmitting data to the UE via at least one of the second set of one or more SSB beams.

25. A base station for wireless communication, comprising:
a memory storing computer-executable instructions; and
at least one processor coupled with the memory and configured to execute the computer-executable instructions to:

transmit, to a user equipment (UE), a first set of one or more SSB beam identifiers corresponding to a first set of one or more SSB beams of a SSB burst;

transmit the SSB burst including the first set of one or more SSB beams to the UE;

receive, from the UE, a first set of measurements corresponding to the first set of one or more SSB beams;

predict, based at least on the first set of measurements, a second set of one or more SSB beams; and transmit, to the UE, a second set of one or more SSB beam identifiers corresponding to the second set of one or more SSB beams.

26. The base station of claim 25, wherein to receive the first set of measurements, the at least one processor is further configured to execute the computer-executable instructions to receive a channel state information (CSI) report including the first set of measurements.

27. The base station of claim 25, wherein to predict, based at least on the first set of measurements, the second set of one or more SSB beams, the at least one processor is further configured to execute the computer-executable instructions to determine, via a prediction model, one or more SSB beams having highest measurement values within the SSB burst.

28. The base station of claim 27, wherein the at least one processor is further configured to execute the computer-executable instructions to:

transmit a third set of one of more SSB beams;

receive, from one or more UEs, based on the third set of one or more beams, a one or more training measurements for generating the prediction model; and generate the prediction model based on the one or more training measurements.

29. The base station of claim 25, wherein to predict, based at least on the first set of measurements, the second set of one or more SSB beams, the at least one processor is further configured to execute the computer-executable instructions to predict the second set of one or more SSB beams based on at least one of a plurality of reference signal received power (RSRP) measurements, a plurality of angular measurements, or historic measurement information.

30. The base station of claim 25, wherein to predict, based at least on the first set of measurements, the second set of one or more SSB beams, the at least one processor is further configured to execute the computer-executable instructions to predict the second set of one or more SSB beams based on a spatial signature.

* * * * *